(12) United States Patent
Jeon et al.

(10) Patent No.: US 12,023,959 B2
(45) Date of Patent: Jul. 2, 2024

(54) SENSING DEVICE FOR VEHICLE, WHEEL BEARING ASSEMBLY AND METHOD FOR MANUFACTURING SENSING DEVICE FOR VEHICLE

(71) Applicant: ILJIN GLOBAL Co., Ltd, Seoul (KR)

(72) Inventors: Chan Goo Jeon, Seoul (KR); Young Tae Kim, Seoul (KR); Joung Woo Hur, Seoul (KR)

(73) Assignee: ILJIN GLOBAL Co., Ltd, Seoul (KR)

( * ) Notice: Subject to any disclaimer, the term of this patent is extended or adjusted under 35 U.S.C. 154(b) by 534 days.

(21) Appl. No.: 17/221,993

(22) Filed: Apr. 5, 2021

(65) Prior Publication Data

US 2021/0221172 A1 Jul. 22, 2021

Related U.S. Application Data

(63) Continuation of application No. PCT/KR2019/012098, filed on Sep. 18, 2019.

(30) Foreign Application Priority Data

Oct. 5, 2018 (KR) .......................... 10-2018-0119278

(51) Int. Cl.
*B60B 27/00* (2006.01)
*G01P 3/44* (2006.01)

(52) U.S. Cl.
CPC .......... *B60B 27/0068* (2013.01); *G01P 3/443* (2013.01); *B60B 2310/318* (2013.01); *F16C 2233/00* (2013.01); *F16C 2326/02* (2013.01)

(58) Field of Classification Search
CPC .......... B60B 27/0068; B60B 2900/511; B60B 2310/204; G01P 3/443; F16C 2233/00; F16C 2326/02
See application file for complete search history.

(56) References Cited

U.S. PATENT DOCUMENTS

| 9,244,090 B2 | 1/2016 | Boro et al. |
| 2007/0139044 A1 | 6/2007 | Lamb et al. |

(Continued)

FOREIGN PATENT DOCUMENTS

| JP | H11507122 A | * | 1/2001 |
| JP | 2005049095 A | * | 2/2005 |

(Continued)

OTHER PUBLICATIONS

International Search Report of PCT/KR2019/012098 dated Jan. 3, 2020.

*Primary Examiner* — Francis C Gray
(74) *Attorney, Agent, or Firm* — Dinsmore & Shohl LLP; Yongsok Choi, Esq.

(57) ABSTRACT

A sensing device for vehicle includes a housing having an opening formed at one side thereof; a sensing part disposed inside the housing and configured to sense wheel-related information to generate a signal; an insert on which the sensing part is mounted and disposed in the housing through the opening; at least one connection part connected to the sensing part so as to supply power to the sensing part or to transmit the signal from the sensing part; a body coupled to the housing and formed of a first material such that a portion of the insert is embedded in the body; and a filling material provided to fill an inner space of the housing therewith and formed of a second material different from the first material.

16 Claims, 8 Drawing Sheets

(56) References Cited

U.S. PATENT DOCUMENTS

2017/0108049 A1\* 4/2017 Nakamura ............ F16C 41/007
2020/0023824 A1\* 1/2020 Lim ........................ G01D 5/14
2020/0309190 A1\* 10/2020 Suma ................. B60B 27/0068

FOREIGN PATENT DOCUMENTS

| JP | 2005049095 A | | 2/2005 |
|---|---|---|---|
| JP | 2013053638 A | | 3/2013 |
| KR | 101363217 B1 | \* | 2/2014 |
| KR | 101363217 B1 | | 2/2014 |

\* cited by examiner

SENSING DEVICE FOR VEHICLE, WHEEL BEARING ASSEMBLY AND METHOD FOR MANUFACTURING SENSING DEVICE FOR VEHICLE

CROSS-REFERENCE TO RELATED APPLICATIONS

This application is a continuation of International Application No. PCT/KR2019/012098 filed on Sep. 18, 2019 which claims priority to Korean Patent Application No. 10-2018-0119278 filed on Oct. 5, 2018, the entire contents of which are herein incorporated by reference.

TECHNICAL FIELD

The present disclosure relates to a sensing device for vehicle configured to sense information related to a wheel for vehicle, a wheel bearing assembly provided with the sensing device for vehicle, and a method of manufacturing the sensing device for vehicle.

BACKGROUND ART

In various types of application systems, such as an Anti-Lock Brake System (ABS) applied to a conventional vehicle, the rotational speed and rotational direction of a wheel are measured. For example, the ABS is a system for preventing a vehicle from overturning or being skidded due to full-locking of a wheel by a brake at the time of braking the vehicle, and is configured to measure the rotational speed and rotational direction of a wheel by a wheel speed sensor in order to control the ABS. The wheel speed sensor may comprise, for example, a target member provided in a ring shape on an inner ring of a bearing coupled to a rotational shaft of the wheel. The target member comprises a plurality of paired magnetic poles. In the wheel speed sensor having such a configuration, the rotational speed and rotational direction of the wheel are measured based on the rotational speed and rotational direction of the target member. The measurement accuracy of the wheel speed sensor is determined by the number of paired magnetic poles. In addition, various sensing techniques for sensing information related to the wheel of vehicle are known.

Meanwhile, in a conventional sensing device for vehicle, there is known a technique for surrounding a sensing part by an injection-molded body so as to prevent the sensing part from being affected by moisture of an external environment.

SUMMARY

Technical Problem

In a case of injection-molding a body configured to surround the sensing part of the sensing device for vehicle, when an integrated circuit (IC), other electronic devices or the like of the sensing part is surrounded by a high-temperature or high-pressure injection material, the sensing part may be damaged or the sensing part may be manufactured as defective. Embodiments of the present disclosure are provided to solve these problems.

Embodiments of the present disclosure provide a technique for preventing a sensing part of a sensing device for vehicle from being affected by an external environment.

Embodiments of the present disclosure provide a technique for further improving a convenience in manufacturing process of a sensing device for vehicle.

Technical Solution

According to one aspect of the present disclosure, there are provided embodiments of a sensing device for vehicle. The sensing device for vehicle according to a representative embodiment may comprise: a housing having an opening formed at one side thereof; a sensing part disposed inside the housing and configured to sense wheel-related information to generate a signal; an insert on which the sensing part is mounted and disposed in the housing through the opening; at least one connection part connected to the sensing part so as to supply power to the sensing part or to transmit the signal from the sensing part; a body coupled to the housing and formed of a first material such that a portion of the insert is embedded in the body; and a filling material provided to fill an inner space of the housing therewith and formed of a second material different from the first material.

In one embodiment, a gap between an inner surface of the housing and the sensing part may be filled with the filling material.

In one embodiment, the filling material may cover at least a portion of the sensing part such that the sensing part is spaced apart from the body.

In one embodiment, the sensing part may comprise a sensor located at a front portion of the sensing part and configured to sense the wheel-related information, and the gap between the inner surface of the housing and a front surface of the sensor may be filled with the filling material.

In one embodiment, a rear surface, which faces the sensing part, in the inner surface of the housing may comprise a sensor counterpart surface that is recessed in a forward direction and faces the front surface of the sensor.

In one embodiment, the sensor counterpart surface may be recessed in a range of 1.8 to 2.2 mm in the forward direction compared to a remaining surface of the rear surface.

In one embodiment, the insert may comprise a stopper counterpart surface in contact with the rear surface in the inner surface of the housing, and the stopper counterpart surface may be located in front of the front surface of the sensing part.

In one embodiment, the sensing part may comprise a printed circuit board (PCB) provided to face in the forward direction. The sensor may be disposed on a front surface of the PCB. The front surface of the sensor may be located at a distance of 0.15 to 0.25 mm in the forward direction from the front surface of the PCB, and the stopper counterpart surface may be located at a distance of 0.8 to 1.2 mm in the forward direction from the front surface of the PCB.

In one embodiment, the first material may comprise a synthetic resin, and the second material may comprise at least one of epoxy, urethane, and hot melt adhesive.

In one embodiment, the body may cover the opening of the housing.

In one embodiment, an end portion of the housing, which forms the opening, may be embedded in the body. The end portion of the housing may comprise a coupling portion having at least one of a rib formed to protrude in a direction perpendicular to a coupling direction in which the housing is coupled to the body and a groove formed to be recessed in the direction perpendicular to the coupling direction.

In one embodiment, the coupling portion may extend to surround the opening.

In one embodiment, the housing may comprise a coupling portion which is coupled to the body and is configured to form the opening. The coupling portion may comprise a rib formed to protrude outward and configured to surround the opening.

In one embodiment, the housing may comprise an insert guide configured to form a groove or protrusion extending parallel to a coupling direction in which the insert is coupled to the housing, and the insert may comprise a slider configured to be engaged with the insert guide.

In one embodiment, the insert may comprise a mounting portion having a surface on which the sensing part is mounted, and the housing may comprise a sensing-part guide configured to form a groove for guiding a position of the sensing part.

In one embodiment, the body may be formed by injection-molding such that a portion of the insert and at least a portion of the housing are embedded in the body in a state in which the insert and the housing are disposed in the body.

In one embodiment, the filling material may be injected into the housing in a liquid state and is solidified inside the housing.

In one embodiment, the sensing part may comprise a sensor configured to sense the wheel-related information, and a protection circuit configured to protect the sensor is provided in the sensing part.

In one embodiment, the sensor may comprise an integrated circuit (IC) chip, and the protection circuit may be configured to protect the IC chip.

In one embodiment, the sensing part may be configured to generate the signal with a predetermined signal interface selected through a programming.

According to another aspect of the present disclosure, there are provided embodiments of a wheel bearing assembly. The wheel bearing assembly according to a representative embodiment may comprise: an outer ring part configured to be fixed to a vehicle body; an inner ring part configured to be rotatable relative to the outer ring part while rotating together with a wheel; a bearing disposed between the outer ring part and the inner ring part; and at least one sensing device configured to sense wheel-related information. In one embodiment, the sensing device may comprise: a body formed of a first material and is disposed fixedly relative to the outer ring part; a housing having an opening formed at one side thereof and coupled to the body; a sensing part disposed inside the housing and configured to sense the wheel-related information to generate a signal; an insert to which the sensing part is fixed and disposed to pass through the opening such that a portion of the insert is embedded in the body; at least one connection part connected to the sensing part so as to supply power to the sensing part or to transmit the signal from the sensing part; and a filling material provided to fill an inner space of the housing and formed of a second material different from the first material.

According to yet another aspect of the present disclosure, there are provided embodiments of a method of manufacturing a sensing device for vehicle. The method of manufacturing the sensing device for vehicle according to a representative embodiment may comprise: (a) step of coupling a sensing part and an insert; (b) step of inserting the insert into an opening of a housing such that the insert passes through the opening of the housing and is disposed inside the housing; (c) step of injecting a filling material in a liquid state into the housing and solidifying the filling material in the housing; and (d) step of injection-molding a body such that a portion of the insert and a portion of the housing are embedded in the body.

In one embodiment, the filling material and the body may be formed of different materials, and the highest temperature according to the solidification of the filling material in the step (c) may be lower than the highest temperature according to the injection-molding of the body in the step (d).

In one embodiment, in the step (d), the body may be injection-molded so as to cover the opening of the housing.

Advantageous Effects

In a sensing device for vehicle according to one embodiment of the present disclosure, a protective layer is additionally formed around a sensing part through a filling material. Thus, it is possible to protect the sensing part from high-temperature or high-pressure material. For example, when a sensing device is formed by injection-molding a body, the sensing part can be stably protected from high-temperature or high-pressure injection-molding material. Particularly, in a case in which the sensing part comprises a printed circuit board (PCB) vulnerable to high-temperature or high-pressure environment, a function of protecting the sensing part with the filling material becomes further important.

In the sensing device according to one embodiment of the present disclosure, a structure of a coupling portion of a housing is further improved, which makes it possible to enhance a fastening force between the housing and the body, and to efficiently prevent moisture from entering between the housing and the body.

In the sensing device according to one embodiment of the present disclosure, an assembly structure of the sensing part and the insert is improved, which makes it possible to perform manufacturing processes of the sensing device in a more convenient and accurate manner.

In the sensing device for vehicle according to one embodiment of the present disclosure, an assembly structure of the housing and the insert is improved, thus performing a process of manufacturing the sensing device for vehicle in a more convenient and accurate manner.

EXPLANATION OF REFERENCE NUMERALS

Figure 1:
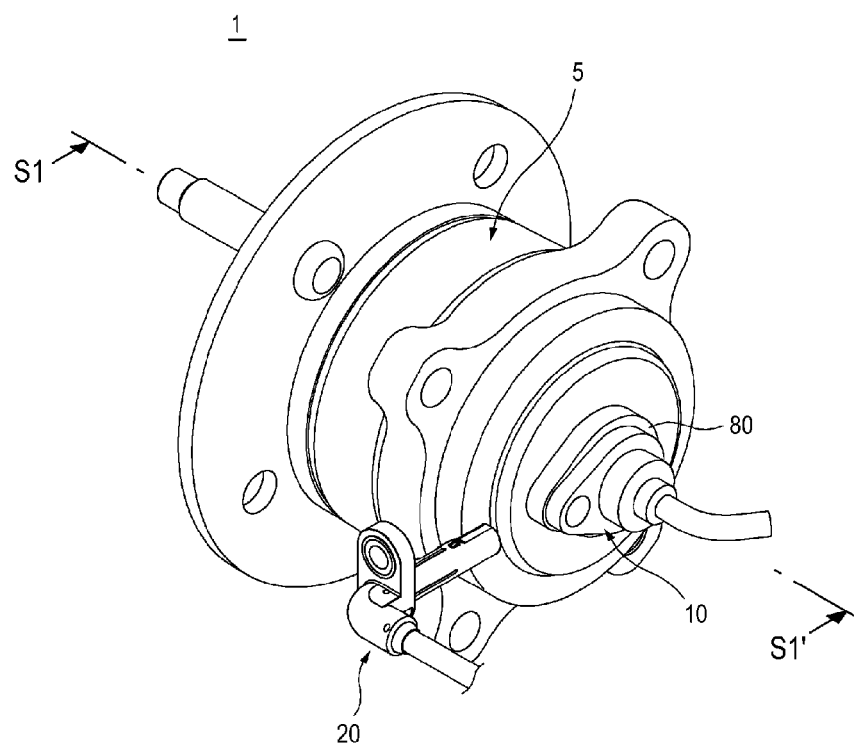
FIG. 1 is a perspective view of a wheel bearing assembly 1 according to one embodiment of the present disclosure.

1: wheel bearing assembly, 5: wheel bearing, 10: first sensing device, 20: second sensing device, 30: inner ring part, 40: outer ring part, 100: sensing part, 110: PCB, 120: sensor, 200: insert, 310: connection part, 311: connection line, 313: terminal, 400: body, 500: fixing part, 600: housing, 700: filling material

DETAILED DESCRIPTION

Embodiments of the present disclosure are exemplified for the purpose of describing the technical spirit of the present disclosure. The scope of the claims according to the present disclosure is not limited to the embodiments described below or to the detailed descriptions of these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising", "including", "having" and the like used herein should be construed as open-ended terms encompassing the possibility of including other embodiments.

The singular form described herein may include the plural form unless the context clearly dictates otherwise, and this is equally applied to the singular form set forth in the claims.

Terms a "first," a "second," and the like are used to distinguish a plurality of components, and the order or importance of corresponding components is not limited by these terms.

The expression "based on" used herein is used to describe one or more factors that influence the action or operation of a decision and determination described in a phrase or sentence in which the expression is included. This expression does not exclude additional factors that influence the action or operation of the decision and determination.

Throughout the present disclosure, when a component is referred to as being "connected" or "coupled" to another component, the component can be directly connected or coupled to another component, or can be connected or coupled to another component by intervening yet another component therebetween.

Dimensions and numerical values described in the present disclosure are not limited only to the dimensions and numerical values described herein. Unless otherwise specified, these dimensions and numerical values may be understood to mean the values described herein and the equivalent ranges including the described values. For example, a dimension of "3 mm" described herein may be understood to include "about 3 mm".

A directional directive of a "radially outward direction" used herein means a direction away from a rotational axis in a radial direction with respect to the rotational axis of a rotating body, and a directional directive of a "radially inward direction" means a direction opposite the radially outward direction. Further, a directional directive of an "axially outward direction" used herein means a direction oriented outward of a vehicle body along the rotational axis of the rotating body, and a directional directive of an "axially inward direction" means a direction oriented inward of the vehicle body along the rotational axis of the rotating body. Throughout the drawings, there are illustrated a rotational axis C of the rotating body, a radially outward direction OR, a radially inward direction IR, an axially outward direction OA, and an axially inward direction IA.

Hereinafter, embodiments of the present disclosure will be described with reference to the accompanying drawings. In the accompanying drawings, the same reference numerals are assigned to the same or corresponding components. Further, in the following descriptions of the embodiments, duplicate descriptions of the same or corresponding components may be omitted. However, even though a description of a component is omitted, such a component is not intended to be excluded in any embodiment.

FIG. 1 is a perspective view of a wheel bearing assembly 1 according to one embodiment of the present disclosure. As shown in FIG. 1, the wheel bearing assembly 1 comprises a wheel bearing 5 provided between a wheel of a vehicle and a vehicle body. The wheel bearing assembly 1 comprises at least one vehicle sensing device 10 (or 20) provided in the wheel bearing 5. In the present embodiment, the wheel bearing assembly 1 comprises a first sensing device 10 and a second sensing device 20. Alternatively, the wheel bearing assembly 1 may comprise only one of the first sensing device 10 and the second sensing device 20.

Figure 2:
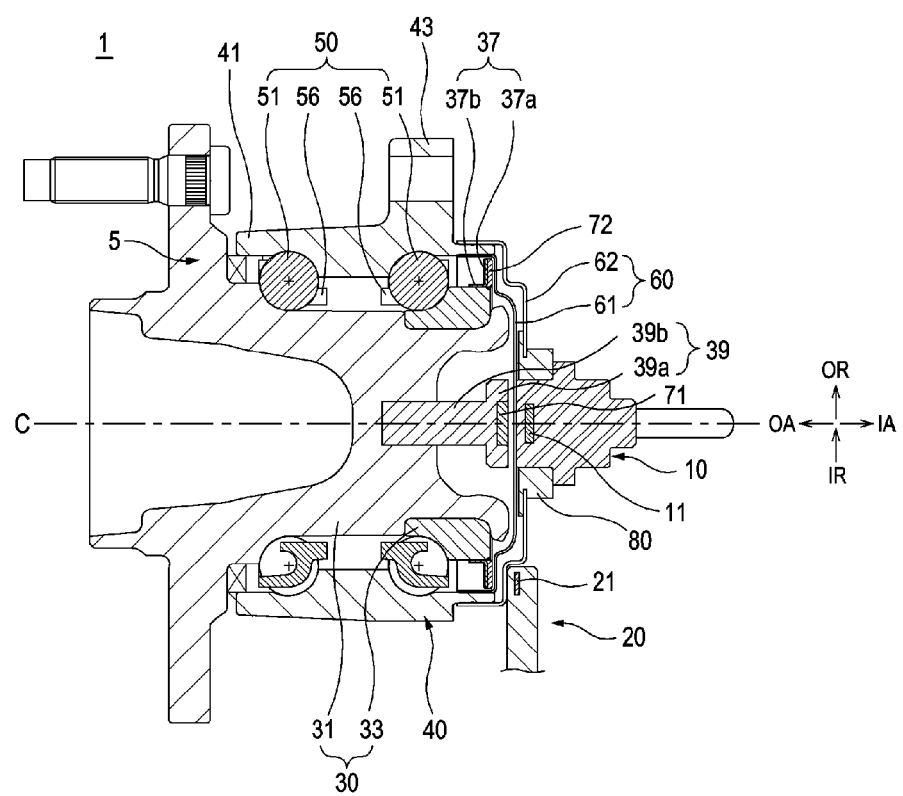
FIG. 2 is a cross-sectional view of the wheel bearing assembly 1, taken along line S1-S1' in FIG. 1.

FIG. 2 is a cross-sectional view of the wheel bearing assembly 1, taken along line S1-S1' in FIG. 1. As shown in FIG. 2, the wheel bearing 5 comprises an outer ring part 40 fixed to the vehicle body, and an inner ring part 30 configured to be rotatable relative to the outer ring part 40. The outer ring part 40 support the inner ring part 30 such that the inner ring part 30 is capable of rotating relative to the outer ring part 40.

The outer ring part 40 may comprise an outer ring 41. The outer ring 41 is coupled to a knuckle (not shown). The outer ring part 40 comprises a flange 43 formed to protrude in the radially outward direction OR from the outer ring 41. The outer ring part 40 and the knuckle may be coupled to each other by means of knuckle bolts (not shown) passing through the flange 43 in the axially direction OA or IA.

The inner ring part 30 is configured to rotate together with the wheel. The inner ring part 30 comprises a wheel hub 31 and an inner ring 33. Alternatively, the inner ring part 30 may comprise the wheel hub 31 alone in another embodiment (not shown). The following descriptions will be made on the inner ring part 30 of the present embodiment. The inner ring 33 is press-fitted to an outer peripheral surface of the wheel hub 31. The inner ring 33 rotates together with the wheel hub 31. The wheel is coupled to the wheel hub 31 so that they rotate in an integral manner. The wheel hub 31 has a flange formed to protrude in the radially outward direction OR. The wheel hub 31 and the wheel may be coupled to each other by means of wheel bolts passing through the flange of the wheel hub 31 in the axially direction OA or IA.

The expression "a first component rotates together with a second component" used herein means that the first component rotates in the same rotational direction and the same rotational speed as the second component, and may encompass a case where the first component is directly coupled (or connected) to the second component such that they rotate as a unit and a case where the first component is coupled (or connected) to a third component and the third component is coupled (or connected) to the second component such that the first component rotates together with the second component.

The wheel bearing 5 comprises a bearing 50 disposed between the outer ring part 40 and the inner ring part 30. The bearing 50 is disposed between an outer peripheral surface of the inner ring part 30 and an inner peripheral surface of the outer ring part 40.

The bearing 50 may comprise a plurality of rolling elements 51 disposed between the outer peripheral surface of the wheel hub 31 and the inner peripheral surface of the outer ring 41 facing the outer peripheral surface of the wheel hub 31. In addition, the bearing 50 may comprise a plurality of rolling elements 51 disposed between the outer peripheral surface of the inner ring 33 and the inner peripheral surface of the outer ring 41 facing the outer peripheral surface of the inner ring 33.

In the present embodiment, the plurality of rolling elements 51 are arranged in two rows at predetermined intervals in the axially direction OA or IA. However, the number of rows of the plurality of rolling elements 51 in the axially direction OA or IA is not limited thereto. The plurality of rolling elements 51 may be arranged in one row or three or more rows. Moreover, in the present embodiment, the plurality of rolling elements 51 are shown as ball bearings, but may be composed of roller bearings, taper roller bearings, needle bearings, and the like. In addition, in the present embodiment, the plurality of rolling elements 51 are formed of metallic material, but may be formed of various materials, such as plastic and the like.

The plurality of rolling elements 51 arranged in each row are arranged in a circumferential direction around the rotational axis C. The bearing 50 may comprise a retainer 56 configured to hold the plurality of rolling elements 51 at regular intervals along the circumferential direction. The retainer 56 confines the position of the plurality of rolling elements 51. The retainer 56 is located between the outer ring part 40 and the inner ring part 30.

The sensing device 10 or 20 for vehicle senses information related to the wheel. As an example, the sensing device 10 or 20 may be configured to sense rotational speed information of the wheel. Wherein, the rotational speed information of the wheel may be information on a scalar quantity, which is a magnitude of a rotational speed of the wheel, or may be information on a vector quantity including the magnitude of the rotational speed and a rotational direction of the wheel. As another example, the sensing device 10 or 20 may be configured to sense rotation angle information of the wheel. As another example, the sensing device 10 or 20 may be configured to sense information on a magnetic field strength so as to provide basic information for determining whether or not an abnormality occurs in an encoder (a first target or a second target to be described later). As another example, the sensing device 10 or 20 may be configured to sense a temperature, acceleration, or pressure information at a specific point of the wheel bearing assembly 1 connected to the wheel. The sensing device 10 or 20 will be described with the embodiment in which each of the rotational speed information or the rotation angle information of the wheel is sensed, but is not necessarily limited thereto.

In an embodiment in which the first sensing device 10 senses at least the rotational speed information or the rotational angle information of the wheel, the wheel bearing 5 comprises a first target 71. In an embodiment in which the second sensing device 20 senses at least the rotational speed information or the rotational angle information of the wheel, the wheel bearing 5 comprises a second target 72. In the present embodiment, the wheel bearing 5 comprises the first target 71 and the second target 72. Alternatively, the wheel bearing assembly 1 may comprise only one of the first target 71 and the second target 72.

The first target 71 is coupled to the inner ring part 30 and rotates together with the inner ring part 30. The first target 71 is coupled to the wheel hub 31 to be disposed on the rotational axis C. The first target 71 has a pair of different magnetic poles. Here, the pair of different magnetic poles refer that different magnetic poles (for example, N and S poles) are combined as a pair to each other. The first target 71 may have a cylindrical shape or a disc shape. The first target 71 may comprise a semicircular N pole and a semicircular S pole.

The first target 71 may be coupled to the wheel hub 31 by a first coupling member 39. The first coupling member 39 may comprise a wheel-hub coupling portion 39b to be coupled to the wheel hub 31, and a first target coupling portion 39a positioned at a front end of the wheel-hub coupling portion 39b and to which the first target 71 is coupled. For example, the wheel-hub coupling portion 39b may be coupled to the center of the wheel hub 31 by a coupling method such as press-fitting, screw coupling, welding, and the like.

The second target 72 is coupled to the inner ring part 30 and rotates together with the inner ring part 30. The second target 72 is coupled to the inner ring 33 to be positioned radially outward of the first target 71. The second target 72 has a ring shape and comprises different magnetic poles arranged alternately along the circumferential direction around the rotational axis C. For example, N poles and S poles are alternately arranged in the second target 72. A plurality of paired N poles and S poles may be arranged in the second target 72.

The second target 72 may be coupled to the inner ring 33 by a second coupling member 37. The second coupling member 37 may comprise a second target coupling portion 37a having a shape corresponding to that of the second target 72, and an inner-ring coupling portion 37b extending vertically from the second target coupling portion 37a to be coupled to the outer peripheral surface of the inner ring 33. The second coupling member 37 may be coupled to the inner ring 33 by pressing the inner-ring coupling portion 37b to the outer peripheral surface of the inner ring 33.

The wheel bearing 5 comprises a cap 60 coupled to an end portion of the outer ring 41 in the axially inward direction IA. The cap 60 covers a surface of the inner ring part 30 in the axially inward direction IA. The cap 60 is coupled to the outer ring 41 to entirely cover the second target 72 and the first target 71. The cap 60 may be made of a reinforced plastic or a non-magnetic metal (for example, stainless steel). When the cap 60 is made of a nonmagnetic metal, the cap 60 may be manufactured by pressing or punching a thin plate-shaped metallic material.

The cap 60 may comprise a first cap 61 to be coupled to the inner peripheral surface of the outer ring 41 and a second cap 62 to be coupled to the outer peripheral surface of the outer ring 41. The first cap 61 covers the inner ring part 30, the first target 71, and the second target 72. The first cap 61 is press-fitted to the inner peripheral surface of the outer ring 41 so as to be coupled to the outer ring 41 in an airtight sealing manner or in a watertight sealing manner. The second cap 62 covers the first cap 61 and the outer ring 41. The second cap 62 may be coupled to the outer ring 41 by caulking, swaging, forcibly press-fitting, or the like in a state in which the second cap 62 is disposed to surround the outer peripheral surface of the outer ring 41. The second cap 62 may have a through-hole through which the first sensing device 10 passes. The through-hole of the second cap 62 is formed at the center of the second cap 62.

The wheel bearing 5 may further comprise a mount 80 that fixes the first sensing device 10 to the cap 60. The mount 80 may be fixed to the second cap 62. The mount 80 may be manufactured by injection-molding or over-molding with plastic material in a state in which the second cap 62 is located to a mold. The mount 80 comprises an opening through which the first sensing device 10 passes and a fastening part (not shown) for fastening the first sensing device 10. The fastening part of the mount 80 may be formed of a screw hole, a nut, or the like.

The first sensing device 10 according to one embodiment of the present disclosure may be configured to sense a change in magnetic field caused by the rotation of the first target 71. A sensing part 11 of the first sensing device 10 may be disposed on the rotational axis C. The first sensing device 10 is disposed to be spaced apart from the first target 71 in the axially inward direction IA. The first sensing device 10 may be disposed at the center of the cap 60.

The first sensing device 10 may sense sensing a change in magnetic field (information related to the wheel) caused by the first target 71 to generate a signal. Here, the information related to the wheel sensed by the first sensing device 10 may be rotation angle information of the wheel. The first sensing device 10 transmits the generated signal to an Electronic Control Unit (ECU) of the vehicle.

The sensing part 11 of the first sensing device 10 may use at least one of a Hall effect, an Anisotropic Magneto-Resistance (AMR) effect, a Giant Magneto-Resistance (GMR) effect, and a Tunnel Magneto-Resistance (TMR) effect to sense the change in magnetic field of the first target 71 caused by the rotation of the wheel hub 31. For example, the first sensing device 10 may measure a voltage which varies according to current applied to a magnetic body, and measure a resistance value of the magnetic body which changes according to a magnetic field induced by the AMR effect, the GMR effect, or the TMR effect, thereby measuring an intensity value of the magnetic field induced to the magnetic body.

The second sensing device 20 according to one embodiment of the present disclosure may sense a change in magnetic field caused by the rotation of the second target 72. A sensing part 21 of the second sensing device 20 is disposed at a position spaced apart from the rotational axis C in the radially outward direction OR. The second sensing device 20 extends in the radially direction IR or OR to form an end portion where the sensing part 21 is located. The second sensing device 20 is spaced apart from the second target 72 in the axially inward direction IA.

The second sensing device 20 may sense a change in magnetic field caused by the second target 72 rotating together with the wheel (information related to the wheel) to generate a signal. Here, the information related to the wheel sensed by the second sensing device 20 may be rotational speed information of the wheel. The second sensing device 20 transmits the generated signal to the ECU of the vehicle.

In one embodiment, the second sensing device 20 may sense an intensity of the magnetic field induced from the second target 72 and generate a signal corresponding to the intensity of the magnetic field. For example, the second sensing device 20 may output a positive electrical signal when being brought close to the N pole of the second target 72 and output a negative electrical signal when being brought close to the S pole of the second target 72. Accordingly, when the second target 72 having a pair of N and S poles rotates once, an electric signal value is outputted as zero at a boundary between the pair of N and S poles, and positive and negative electric signals representing that the intensity value of the magnetic field is maximum are outputted at the middle of each of the N pole and the S pole. Thus, a signal of a sine wave of one cycle can be outputted. Under such an operating principle, the resolution of the second sensing device 20 may be determined based on the number of poles of magnets of the second target 72. For example, when the second target 72 has five pairs of N poles and S poles, an electrical signal of the sine wave of a total five-cycle is outputted while the second target 72 rotates once. Thus, the second sensing device 20 can measure the rotational speed of the wheel with a resolution of 72 degrees (360 degrees/5). In general, the second target 72 has 43 to 80 pairs of magnetic poles. In this case, the second sensing device 20 can sense the rotational speed information of the vehicle wheel with a resolution of about 3 to 8 degrees to generate the signal.

The above functions of the first sensing device 10 and the second sensing device 20 are merely one example. Alternatively, the first sensing device 10 may be configured to further perform the function of the second sensing device 20 described above. Furthermore, the first sensing device 10 may be configured to perform other functions than the above functions to detect information related to the wheel.

Next, the sensing device for vehicle according to one embodiment will be described in detail with reference to FIGS. 3 to 9. Hereinafter, the sensing device according to one embodiment of the present disclosure will be described with reference to the structure of the first sensing device. However, it is also applicable to the second sensing device.

In order to explain the present disclosure, a spatial rectangular coordinate system based on an X-axis, Y-axis and Z-axis that are perpendicular to each other is defined. Each axial direction (X-axis direction, Y-axis direction, Z-axis direction) means both directions in which each axis extends. A symbol "+" added in front of each axial direction (+X-axis direction, +Y-axis direction, +Z-axis direction) means a positive direction, which is one of both directions in which each axis extends. A symbol "−" added in front of each axial direction (−X-axis direction, −Y-axis direction, Z-axis direction) means a negative direction, which is the other direction of both directions in which each axis extends. The expressions "Forward (+X)", "Backward (X)", "Left (−Y)", "Right (+Y)", "Upward (+Z)", "Downward (−Z)" as directional directives used herein are defined according to the XYZ coordinate axis. However, it should be noted that this is nothing more than one example for clearly explaining the present disclosure and each direction may be defined differently depending on where the reference is placed.

Figure 3:
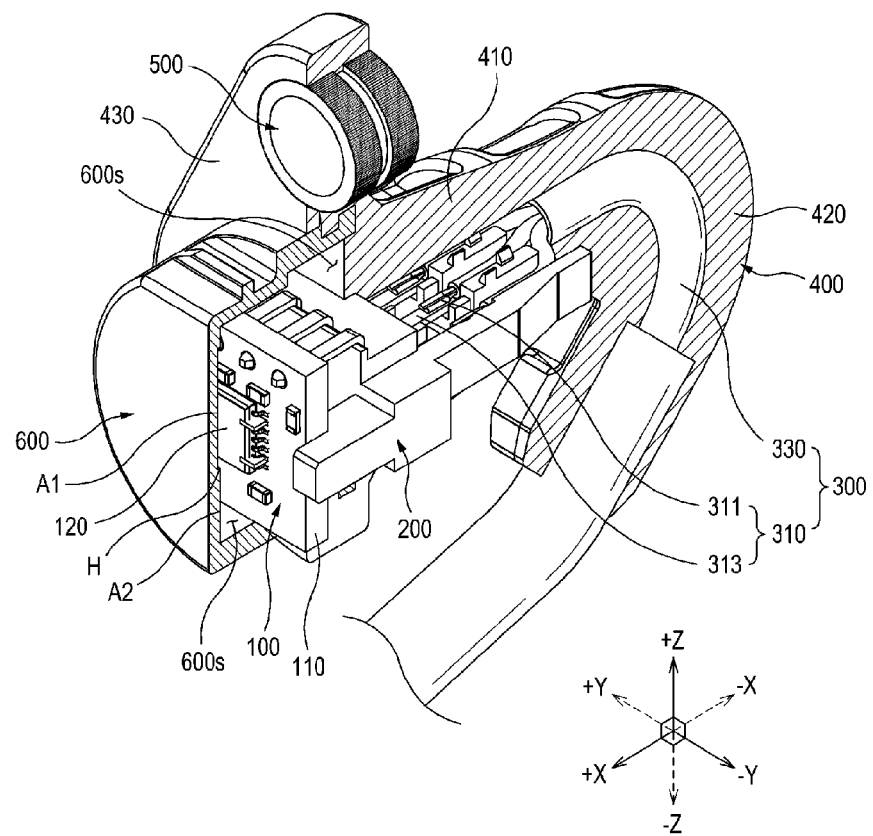
FIG. 3 is a partially cutaway perspective view of a body 400 in the sensing device for vehicle according to one embodiment of the present disclosure, wherein a filling material 700 is omitted.
Figure 4:
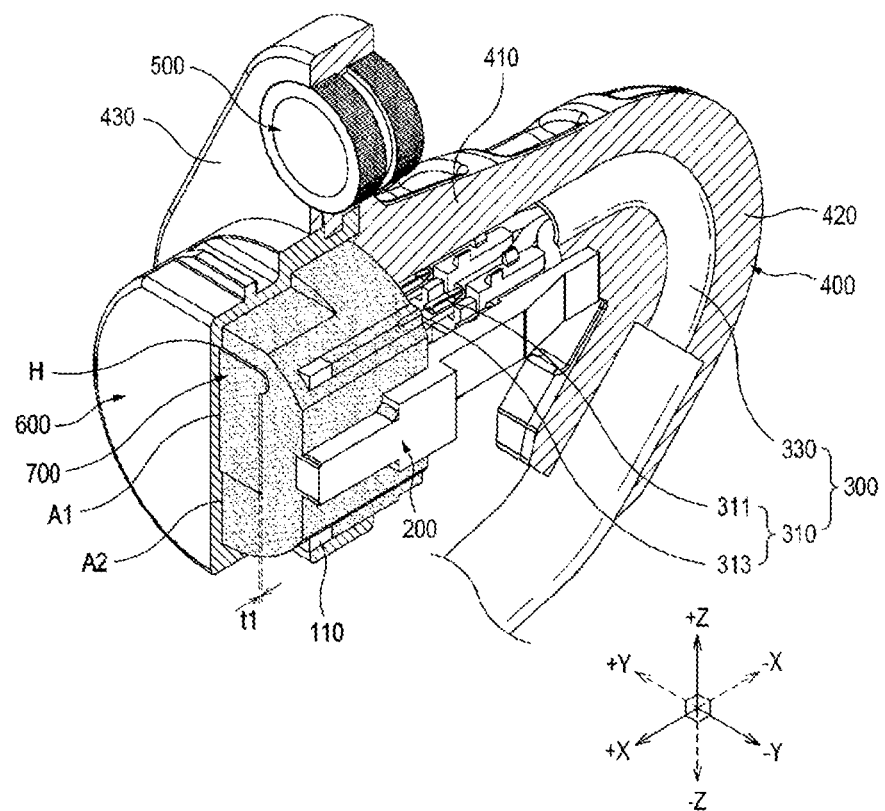
FIG. 4 is a partially cutaway perspective view of a body 400 in the sensing device for vehicle according to one embodiment of the present disclosure, wherein a filling material 700 is shown in FIG. 4.

FIGS. 3 and 4 are partially cutaway perspective view of a body 400 in the sensing device for vehicle according to one embodiment of the present disclosure, wherein a filling material 700 is omitted in FIG. 3 and is shown in FIG. 4. As shown in FIGS. 3 and 4, the sensing device according to one embodiment of the present disclosure comprises a sensing part 100, an insert 200, a connection unit 300, a body 400, a fixing part 500, a housing 600, and a filling material 700.

The sensing part 100 is disposed inside the housing 600. At least a portion of the sensing part 100 is covered by the filling material 700. Front portions of the sensing part 100 and the insert 200 may be surrounded by the filling material 700.

A directional directive of a "forward direction" used herein means a direction of a sensing object to be sensed by the sensing part 100, and a directional directive of a "backward direction" means a direction opposite the forward direction. In the present embodiment, the sensing object to be sensed by the sensing part 100 is the first target 71, the forward direction corresponds to the axially outward direction OA, and the backward direction corresponds to the axially inward direction IA.

The sensing part 100 senses the wheel-related information to generate a signal. The sensing part 100 may comprise a sensor (IC) 120 for performing a signal generating function.

Hereinafter, a type of wheel-related information will be exemplarily described. As an example, the wheel-related information may be rotational speed information of the wheel, rotational angle information of the wheel, or information on the presence or absence of abnormality of the target which may be a change in a magnetic field or intensity information of the magnetic field. As another example, the wheel-related information may be temperature information of a place where one sensing part is located. The temperature information may be used to compensate for another signal generated by another sensing part. As another example, the wheel-related information may be acceleration or pressure information. Based on the acceleration or the pressure information, the ECU may determine the condition of a place where the sensing parts are located and the presence or absence of abnormality of the sensing parts.

In one embodiment, the wheel-related information comprises the rotational angle information of the wheel. Here, the wheel-related information is the rotational speed information of the wheel, and the sensing part 100 may comprise a sensor 120 (for example, a wheel speed sensor) for measuring the rotational speed information. In another embodiment, the wheel-related information may comprise the rotational angle information of the wheel, and the sensing part 100 may comprise a sensor 120 (for example, a high-resolution wheel rotation position sensor) for measuring the rotational angle information. In yet another embodiment, the wheel-related information may comprise the information on the presence or absence of abnormality of the target, and the sensing part 100 may comprise a sensor 120 for sensing the intensity information of the magnetic field. The sensor 120 may be formed of an integrated circuit (IC). The sensor 120 may be disposed on a printed circuit board (PCB) 110.

Further, the wheel-related information may comprise the temperature information, the acceleration information, or the pressure information. The sensing part 100 may further comprise an element (not shown) for measuring the temperature, the acceleration, or the pressure. The element may be disposed on the PCB 110.

The signal generated by the sensing part 100 may constitute a signal interface according to an application, and different types of signals may be employed according to characteristics of the vehicle. The sensing part 100 may be configured to generate the signal with the signal interface selected through a programming. For example, the signal(s) generated by the sensing part 100 may be any one form of a square wave, a pulse width modulation (PWM) signal, an ArbeitsKreis protocol (AK-protocol) signal, an incremental signal, a serial peripheral interface (SPI) signal, a single edge nibble transmission (SENT) signal, an application binary interface (ABI) signal and a UVW three-phase signal.

The sensing part 100 is fixed to the insert 200. For example, the sensing part 100 is fixed to the front portion of the insert 200. The insert 200 is inserted into an opening 600h of the housing 600. The insert 200 is disposed to pass through the opening 600h of the housing 600. The insert 200 is supported by the body 400.

A portion of the insert 200 is disposed within the body 400. A portion of the insert 200 is disposed to be embedded in the body 400. Another portion of the insert 200 is disposed within the housing 600. Another portion of the insert 200 is disposed to be embedded in the filling material 700. A portion supporting the sensing part 100 in the insert 200 is disposed inside the housing 600. A portion supporting the sensing part 100 in the insert 200 is disposed to be embedded in the filling material 700. In the present embodiment, the rear portion of the insert 200 is disposed within the body 400, and the front portion of the insert 200 is disposed within the housing 600.

The connection unit 300 comprises at least one connection part 310 connected to the sensing part 100 in a wired manner. The connection part 310 is connected to the sensing part 100 to supply power to the sensing part 100 or to transmit the signal from the sensing part 100.

The connection part 310 comprises a connection line 311 formed in a wire shape. The connection line 311 may comprise an inner metallic conductive wire portion and a covering part surrounding the metallic conductive wire portion, and the covering portion may be configured to expose one end portion of the metallic conductive wire portion. The connection part 310 may comprise a plurality of connection lines 311. In the present embodiment, the connection part 310 comprises four connection lines 311.

The connection part 310 may further comprise a terminal 313 constituting one end portion of the connection part 310. The terminal 313 is disposed to connect the connection line 311 and the sensing part 100. In the present embodiment, the connection part 310 is described to comprise the connection line 311 and the terminal 313, but in another embodiment (not illustrated). However, the connection part 310 may comprise the connection line 311 alone and the end of the connection line 311 may be directly connected to the sensing part 100 in another embodiment (not shown).

The connection unit 300 may further comprise a covering member 330 that collectively covers the plurality of connection lines 311. The covering member 330 encloses the plurality of connection lines 311 so that they may constitute a cable. The covering member 330 may be configured to expose one end portions of the plurality of connection lines 311. The one end portions of the plurality of connection lines 311 may be separated from each other.

The sensing device according to one embodiment of the present disclosure comprises the body 400 arranged fixedly relative to the outer ring part 40.

A portion of the insert 200 is disposed within the body 400. The body 400 is formed such that a portion of the insert 200 is embedded in the body 400. The body 400 is coupled to the insert 200. The body 400 supports the insert 200.

At least a portion of the housing 600 is disposed within the body 400. The body 400 is configured such that at least a portion of the housing 600 is embedded in the body 400. The body 400 is coupled to the housing 600. The body 400 supports the housing 600.

In a state in which the insert 200 and the housing 600 are arranged, the body 400 is over-molded. The body 400 may be injection-molded in the state in which the insert 200 and the housing 600 are arranged, and may be configured such that a portion of the insert 200 and at least a portion of the housing 600 may be embedded in the body 400. A portion disposed outside the housing 600 in the insert 200 may be embedded in the body 400. While a portion of the housing 600 is configured to be embedded in the body 400 in the present embodiment, the housing 600 may be configured to be entirely embedded in the body 400 in another embodiment (not illustrated).

The body 400 covers the opening 600h of the housing 600. An end portion of the housing 600 forming the opening 600*h* is embedded in the body 400. A rear end portion of the housing 600 confines the opening 600*h* that faces in the backward direction, and the rear end portion of the housing 600 is embedded in the body 400. An inner space 600*s* of the housing 600 is opened in the backward direction through the opening 600*h*.

The body 400 is formed of a predetermined first material. The first material may be a material which is capable of being injection-molded, and may be different from a second material of the housing 600 to be described later.

The first material may comprise a synthetic resin. The synthetic resin of the first material may comprise a thermoplastic resin. For example, the thermoplastic resin may be polystyrene, polyethylene, polyamide, acrylonitrile butadiene styrene (ABS), or the like.

The body 400 comprises an insert cover portion 410 covering a portion of the insert 200 and a cable cover portion 420 covering one end portion of the connection unit 300. A front portion of the insert cover portion 410 is coupled to a rear portion of the housing 600. In addition, the body 400 comprises a flange portion 430 on which the fixing part 500 is disposed. The insert cover portion 410, the cable cover portion 420 and the flange portion 430 are integrally formed.

The fixing part 500 performs a function of fixing the body 400 to the vehicle body, the outer ring part 40, the cap 60, or the like. The fixing part 500 may have a hole formed in the center thereof and through which a fastening member passes. In a state in which the fixing part 500 is disposed, the body 400 may be injection-molded so that the fixing part 500 is fixed to the body 400.

The housing 600 has the opening 600*h* formed at one side thereof. In present embodiment, the housing 600 has the opening 600*h* opened in the backward direction. The front portion of the insert 200 is inserted into the inner space 600*s* of the housing 600 through the opening 600*h*. The sensing part 100 is inserted into the inner space 600*s* of the housing 600 through the opening 600*h*. The filling material 700 may be injected into the inner space 600*s* of the housing 600 through the opening 600*h*.

The inner space 600*s* of the housing 600 is filled with the filling material 700. A gap between an inner surface of the housing 600 and the sensing part 100 is filled with the filling material 700. A gap between the inner surface of the housing 600 and the insert 200 is filled with the filling material 700. The filling material 700 covers at least a portion of the sensing part 100. The filling material 700 covers at least a portion of the front portion of the insert 200.

The filling material 700 covers at least a portion of the sensing part 100 such that the sensing part 100 is spaced apart from the body 400. The filling material 700 covers a portion of the rear surface of the sensing part 100, which is not in contact with the insert 200. The gap except for the sensing part 100 and the insert 200 in the inner space 600*s* of the housing 600 is filled with the filling material 700. As a result, it is possible to prevent an injection-molding material of a liquid state from being introduced into the housing through the opening 600*h* and then being in contact with the sensing part 100 when injection-molding the body 400.

The filling material 700 may cover the front surface of the sensing part 100. The filling material 700 may cover the front surface of the sensor 120. A gap between the inner surface of the housing 600 and the front surface of the sensor 120 may be filled with the filling material 700.

The filling material 700 is injected into the housing 600 in a liquid state and solidified in the housing 600. A gap in the inner space 600*s* of the housing 600 is filled with the liquid filling material 700. The filling material 700 is solidified to be coupled with the housing 600, the sensing part 100, and the insert 200.

The filling material 700 is formed of a second material different from the first material forming the body 400. The second material may be a material which may be injected in a liquid state and then solidified. The second material may comprise at least one of epoxy, urethane, and hotmelt adhesive. The hotmelt adhesive is an adhesive having a property that is melted by heating and solidified by cooling. In the present embodiment, the second material is an epoxy material.

Figure 5:
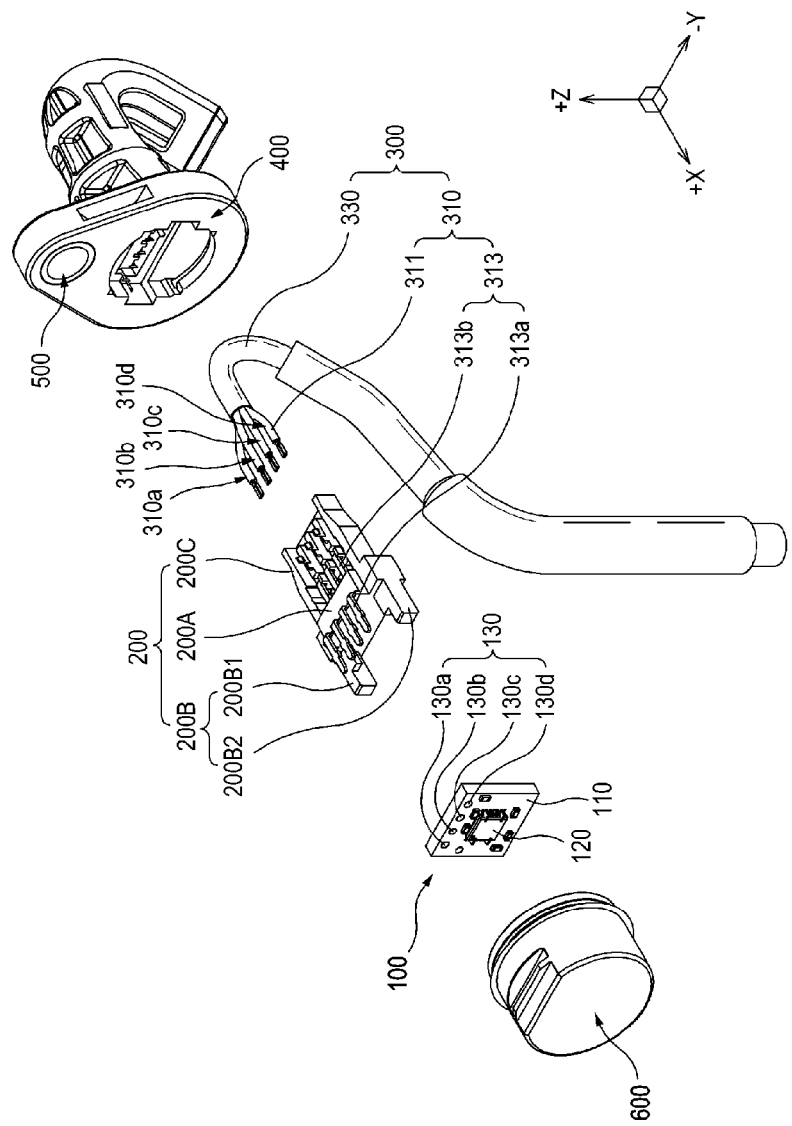
FIG. 5 is an exploded perspective view of the sensing device in FIG. 3, wherein the filling material 70 is omitted.

FIG. 5 is an exploded perspective view of the sensing device in FIG. 3, omitting the filling material 700. As shown in FIG. 5, the sensing part 100 may comprise the PCB 110. The filling material 700 may cover at least a portion of the PCB 110 such that the PCB 110 is spaced apart from the body 400. This prevents the injection-molding material at high-temperature and/or high-pressure from adversely affecting the PCB 110, at the time of injection-molding the body 400. Since the PCB 110 is vulnerable to high-temperature and high-pressure environment, the technical meaning of the filling material 700 may be further important.

The sensing part 100 may comprise a protection circuit (not shown) configured to protect the sensor 120. Such a protection circuit may be provided in the PCB 110. For example, the protection circuit may perform a function of blocking a reverse voltage or a strong electric shock. The protection circuit may block direct damage to the sensor 120. For example, the protection circuit may block abnormal electromagnetic waves and overcurrent from being introduced from the outside.

The sensing part 100 may comprise a coding circuit (not shown) that is program-coded to correspond to a request. The coding circuit may be configured to perform the program coding to meet the user's needs. The coding circuit may be provided in the PCB. The coding circuit may allow the sensor 120 to generate a signal through the program coding and determine the resolution of the sensor 120.

The sensing part 100 comprises the sensor 120 of generating the signal. The sensor 120 senses the wheel-related information. The sensor 120 performs a function based on power supplied thereto. The sensor 120 may be disposed on the PCB 110. The sensor 120 may be configured as an integrated circuit (IC) chip.

The sensing part 100 may further comprise an auxiliary sensor (not shown) in addition to the sensor 120. The auxiliary sensor may be disposed on the PCB 110. For example, the auxiliary sensor may comprise an element configured to measure temperature, acceleration, pressure, or the like.

The sensing part 100 comprises a terminal part 130 connected to the connection part 310 so as to transmit the signal to the connection part 310 or to receive the power from the connection part 310. The terminal part 130 may be formed on the PCB 110. In the present embodiment, the terminal part 130 is configured to have four terminals 130*a*, 130*b*, 130*c*, and 130*d*. The plurality of terminals 130*a*, 130*b*, 130*c*, and 130*d* may be arranged in a lateral direction.

The insert 200 comprises a body portion 200A, a protruded portion 200B, and a connection-part guide 200C. The protruded portion 200B protrudes in the forward direction from the body portion 200A. A pair of protruded portions 200B1 and 200B2 may protrude in the forward direction from the body portion 200A. The pair of protruded portions 200B1 and 200B2 may be disposed at both left and right sides. The protruded portion 200B guides a position of the sensing part 100 with respect to the insert 200. The protruded portion 200B is coupled to the housing 600. The connection-part guide 200C may protrude in the backward direction from the body portion 200A. The connection-part guide 200C may guide a position of the connection part 310 with respect to the insert 200.

A plurality of connection parts 310*a*, 310*b*, 310*c*, and 310*d* may be provided to be connected to the sensing part 100 in a wired manner. For example, the connection part 310*a* may supply power to the sensing part 100, and the other connection parts 310*b*, 310*c* and 310*d* may transmit a signal generated by the sensing part 100 to the ECU. In this case, the signal may comprise a plurality of signals. The plurality of signals may be transmitted to the ECU via different connection parts, respectively. While in the present embodiment, the four connection parts 310*a*, 310*b*, 310*c* and 310*d* are provided, a larger number of connection parts may be provided.

The terminal part 130 is connected to one end of the terminal 313. The terminal 313 comprises a terminal coupling portion 313*a* in contact with the terminal part 130. The terminal coupling portion 313*a* may be inserted into and coupled to a hole formed in the terminal part 130 of the PCB 110.

The other end of the terminal 313 is connected to the connection line 311. The terminal 313 comprises a connection-line coupling portion 313*b* in contact with the connection line 311. An end portion of a metallic conductive wire portion of the connection line 311 may be rolled up and down. The rolled end portion of the metallic conductive wire portion and the connection-line coupling portion 313*b* may be brought into contact with each other in the vertical direction. The connection line 311 and the terminal 313 may be connected to each other in various manners. For example, resistance welding, laser welding, soldering, clamping, or the like may be used as such a connection manner.

Figure 6:
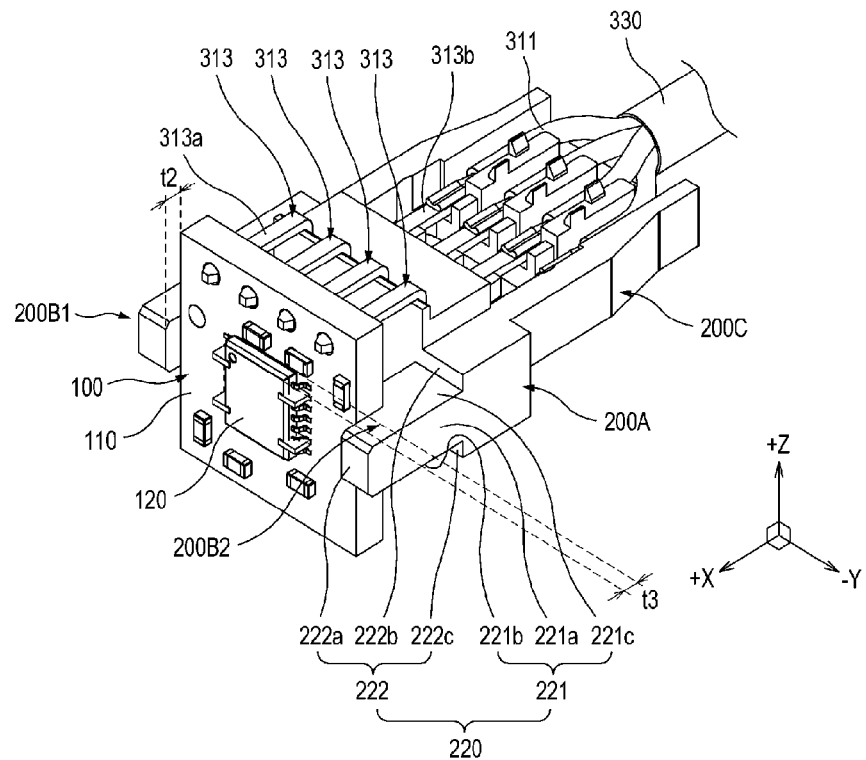
FIG. 6 is a perspective view showing a state in which a sensing part 100, an insert 200, and a connection unit 300 in FIG. 5 are assembled.
Figure 7:
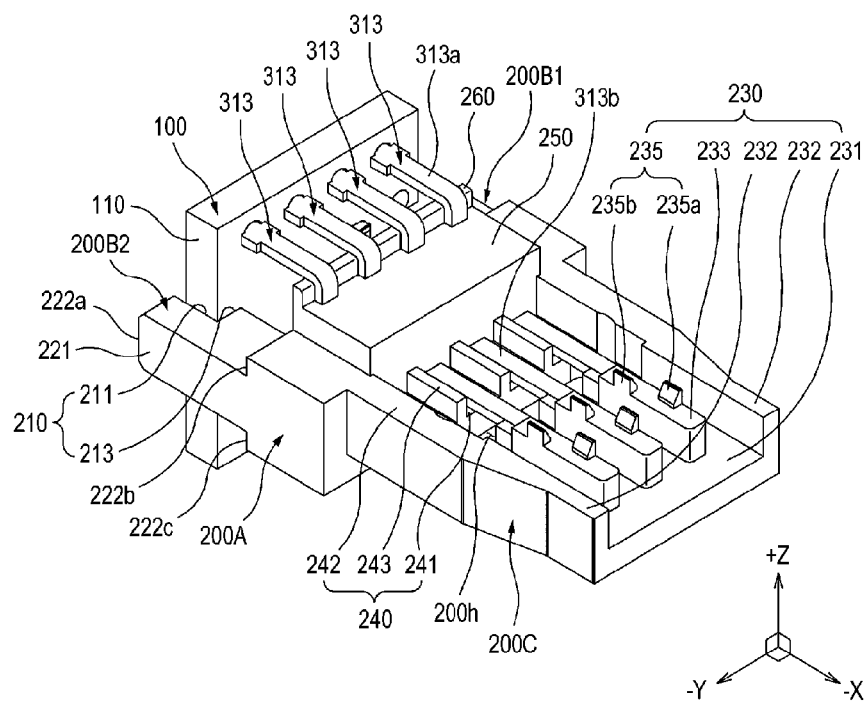
FIG. 7 is a perspective view showing a state in which the sensing part 100 and the insert 200 in FIG. 5 are assembled when viewed in another direction.

FIG. 6 is a perspective view showing a state in which the sensing part 100, the insert 200, and the connection unit 300 in FIG. 5 are assembled. FIG. 7 is a perspective view showing a state in which the sensing part 100 and the insert 200 in FIG. 5 are assembled. As shown in FIGS. 6 and 7, the body portion 200A of the insert 200 comprises a terminal fixing portion 250 and an edge portion 260. The protruded portion 200B of the insert 200 comprises a mounting portion 210 and a slider 220. The connection-part guide 200C of the insert 200 comprises a connection-line guide 230 and a terminal guide 240.

The terminal fixing portion 250 fixes the terminal 313 to the insert 200. The terminal fixing portion 250 is injection-molded in a state in which the terminals 313 are disposed so that the terminals 313 are embedded in the terminal fixing portion 250. In the present embodiment, a portion between the terminal coupling portion 313 a and the connection-line coupling portion 313*b* of the terminal 313 is embedded in the terminal fixing portion 250. Each of the plurality of terminals 313 is configured such that the terminal coupling portion 313 a, the portion (not shown) embedded in the terminal fixing portion 250, and the connection-line coupling portion 313*b* are sequentially connected.

The edge portion 260 is disposed on one side of the terminal fixing portion 250 to form an edge. In the present embodiment, the edge portion 260 forms the edge connecting an upper surface and a rear surface. The terminal 313 may be formed by being bent along the edge portion 260. In the present embodiment, the terminal 313 is bent in the forward direction along the edge portion 260 at a portion extending in the vertical direction, thereby forming the terminal coupling portion 313*a*.

The mounting portion 210 guides the position of the sensing part 100. The sensing part 100 is disposed at the front portion of the insert 200. The mounting portion 210 has a surface on which the sensing part 100 is mounted. The sensing part 100 is disposed in contact with the mounting portion 210. A pair of mounting portions 210 are provided to correspond to the pair of protruded portions 200B1 and 200B2. A gap is formed between the pair of mounting portions 210 positioned in the lateral direction. The sensing part 100 is positioned in the gap. The sensing part 100 is disposed at a predetermined position by being inserted into the insert 200 backward from the front side.

The mounting portion 210 has at least one clamping surface 211 which is in contact with the sensing part 100 in the lateral direction. A pair of clamping surfaces 211 face each other in the lateral direction. The sensing part 100 is clamped between the pair of clamping surfaces 211.

The mounting portion 210 has at least one locking surface 213 which is in contact with the sensing part 100 in the forward-backward direction. The at least one locking surface 213 may comprise a pair of locking surfaces 213. The locking surfaces 213 are oriented in the forward direction.

The slider 220 is engaged with an insert guide 620 (to be described later) of the housing 600. The slider 220 has at least one sliding surface 221 that defines a surface extending in the forward-backward direction. The at least one sliding surface 221 may be slidably inserted along the inner surface of the housing 600 so that the housing 600 and the insert 200 may be coupled to each other.

The at least one sliding surface 221 may comprise a pair of sliding surfaces 221 provided at left and right sides. Each of the pair of sliding surfaces 221 may comprise a first sliding surface 221*a* in contact with the inner surface of the housing 600 in the lateral direction. Each of the pair of sliding surfaces 221 may comprise a second sliding surface 221*b* and a third sliding surface 221*c* in contact with the inner surface of the housing 600 in the vertical direction. The second sliding surface 221*b* is oriented downward, and the third sliding surface 221*c* is oriented upward.

The slider 220 may comprise at least one stopper counterpart portion 222 oriented in the forward direction. The stopper counterpart portion 222 is brought into contact with the stopper 622 of the housing 600 such that the insert 200 is disposed at the predetermined position with respect to the housing 600.

The at least one stopper counterpart portion 222 may comprise a pair of stopper counterpart portions 222 provided at left and right sides. Each of the pair of stopper counterpart portions 222 may comprise a plurality of front surfaces spaced apart from each other in the forward-backward direction. The stopper counterpart portion 222 may comprise a first stopper counterpart surface 222*a* disposed at a relatively front side and second stopper counterpart surfaces 222*b* and 222*c* disposed at a relatively rear side. The second stopper counterpart surfaces 222*b* and 222*c* may be formed by two surfaces spaced apart from each other in the vertical direction.

The first stopper counterpart surface 222*a* may be disposed at the front side of the sliding surface 221. The second stopper counterpart surfaces 222*b* and 222*c* may be disposed at the rear side of the sliding surface 221.

The connection-part guide 200C guides a position of one end of the connection part 310. The connection-part guide 200C comprises a connection-line guide 230 for guiding a position of one end of each of the plurality of connection lines 311. The connection-part guide 200C may comprise a terminal guide 240 for guiding a position of the connection-line coupling portion 313b of each of the plurality of terminals 313.

The connection-line guide 230 may comprise a base 231 for supporting a lower surface of the connection line 311. The connection-line guide 230 may comprise a pair of outer guides 232 which protrude upward from left and right ends of the base 231 and extend in the forward-backward direction. One end of the plurality of connection lines 311 may be positioned in a space in which the base 231 and the pair of outer guides 232 provided at the left and right sides.

The connection-line guide 230 may comprise at least one separation guide 233 disposed between two adjacent connection lines 311. The separation guide 233 protrudes upward from the base 231 and extends in the forward-backward direction. The at least one separation guide 233 may comprise a plurality of separation guides 233.

The connection-line guide 230 may further comprise an insertion guide 235 protruding upward from an upper end of the separation guide 233. The insertion guide 235 may perform a function of guiding the connection line 311 when the connection line 311 is inserted into the predetermined position of the insert 200 from above downward. The insertion guide 235 comprises a first insertion guide 235a which forms a surface extending vertically from the right side of the separation guide 233, and a second insertion guide 235b which forms a surface extending vertically from the left side of the separation guide 233. The first insertion guide 235a and the second insertion guide 235b may be disposed in one separation guide 233. The first insertion guide 235a and the second insertion guide 235b disposed at an upper end of one separation guide 233 may be spaced apart from each other in the forward-backward direction.

The terminal guide 240 may comprise a base 241 that supports a lower surface of the terminal 313. The terminal guide 240 may comprise a pair of outer guides 242 which protrude upward from left and right ends of the base 241 and extend in the forward-backward direction. A connection-line coupling portions 313b of the plurality of terminals 313 may be positioned in a space in which the base 241 and the pair of outer guides 242 provided at the left and right sides are formed.

The terminal guide 240 may comprise at least one separation guide 243 disposed between two adjacent terminals 313. The separation guide 243 protrudes upward from the base 241 and extends in the forward-backward direction. The at least one separation guide 243 may comprise a plurality of separation guides 243.

The insert 200 has at least one hole 200h formed at a portion corresponding to a connection point where the connection line 311 and the terminal 313 are connected to each other. The hole 200h is positioned below the connection point. The hole 200h may pass through the insert 200 in the vertical direction.

The sensor 120 may be located at a front portion of the sensing part 100. The sensor 120 may be disposed to protrude in the forward direction from the sensing part 100. The front surface of the sensor 120 may be the forefront surface of the sensing part 100.

The PCB 110 may be oriented in the forward direction. The sensor 120 may be disposed on the front surface of the PCB 110. The front surface of the sensor 120 may be positioned in front of the front surface of the PCB 110 by a predetermined distance t3.

The insert 200 may comprise a forefront stopper counterpart surface (the first stopper counterpart surface 222a) which is in contact with a rear surface out of the inner surface of the housing 600. The forefront stopper counterpart surface (the first stopper counterpart surface 222a) is positioned at a foremost position in the insert 200. Specifically, the first stopper counterpart surface 222a may be in contact with a rear surface A2 of the housing 600.

The forefront stopper counterpart surface (the first stopper counterpart surface 222a) is located in front of the forefront surface of the sensing part 100. The first stopper counterpart surface 222a of the insert 200 may be positioned in front of the front surface of the PCB 110 by a predetermined distance t2.

The distance t2 is longer than the distance t3. The distance t2 may be in a range of 0.8 to 1.2 mm. For example, the distance t2 is 1.1 mm. The distance t3 may be in a range of 0.15 to 0.25 mm. For example, the distance t3 may be 0.2 mm. Accordingly, a position at which the insert 200 is assembled to the housing 600 can be accurately set. Further, the front surface of the sensing part 100 can be spaced apart from the rear surfaces A1 and A2 of the housing 600 by the distances so that the front surface of the sensing part 100 can be covered with the filling material 700.

Figure 8:
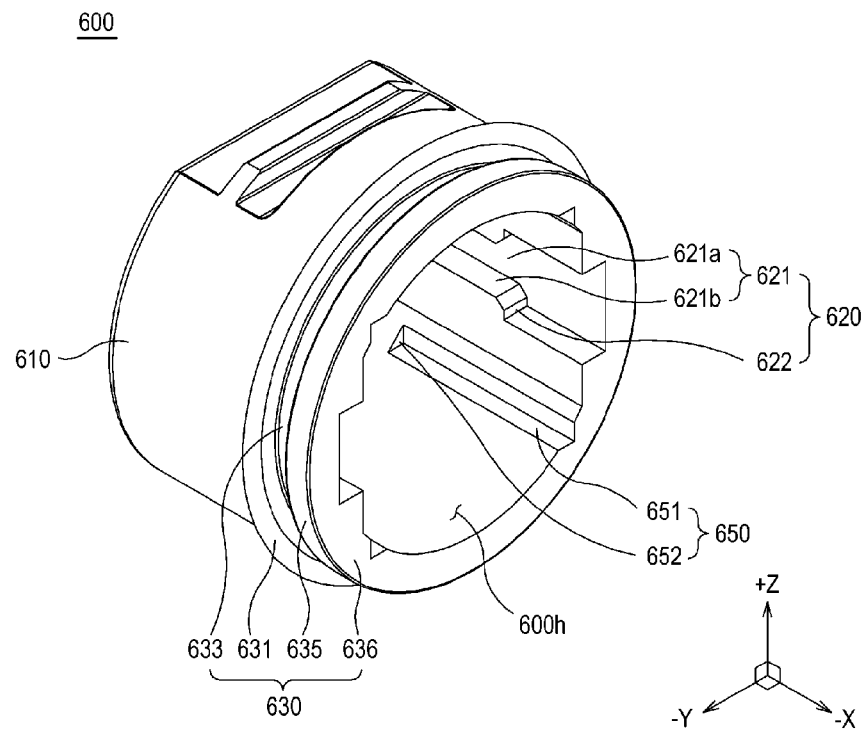
FIG. 8 is a perspective view of a housing 600 in FIG. 5.
Figure 9:
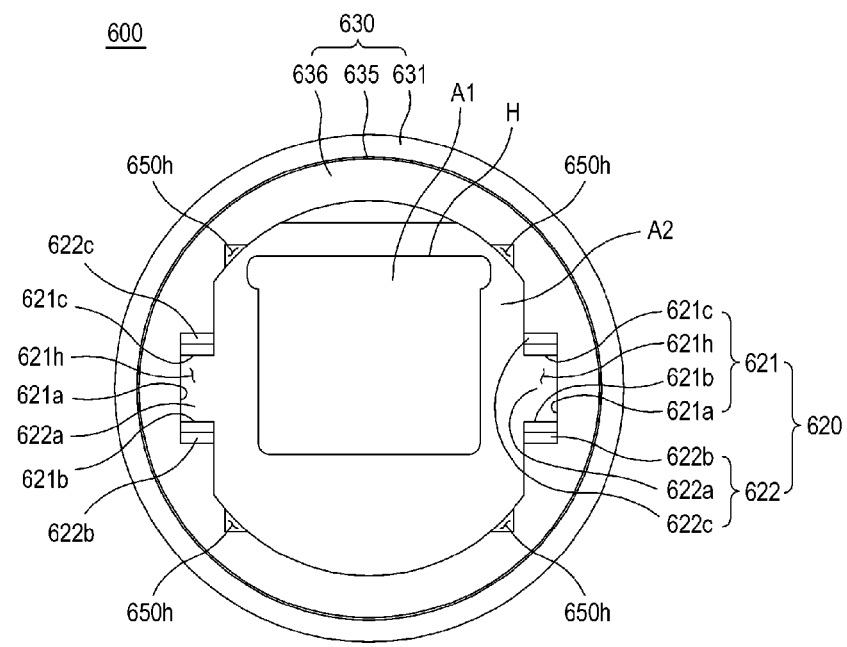
FIG. 9 is an elevation view of the housing 600 in FIG. 8.

FIG. 8 is a perspective view of the housing 600 in FIG. 5. FIG. 9 is an elevation view of the housing 600 in FIG. 8. As shown in FIGS. 8 and 9, the housing 600 comprises the inner space 600s formed to have the opening 600h opened in the backward direction. A direction in which the housing 600 and the body 400 are coupled to each other may be parallel to the direction of the opening 600h. In the present embodiment, the direction in which the housing 600 and the body 400 are coupled to each other corresponds to the forward-backward direction.

The housing 600 comprises a housing body 610 which defines an outer surface thereof. The inner space 600s is formed inside the housing body 610. The housing body 610 has a generally cylindrical shape extending in the forward-backward direction. The housing body 610 surrounds the inner space 600s except for the opening 600h oriented in the backward direction.

The housing 600 comprises an insert guide 620 provided to form a groove 621h or protrusion (not shown) extending parallel to the coupling direction of the housing 600 and the insert 200. In the present embodiment, the insert guide 620 forms the groove 621h. Alternatively, the insert guide 620 may form the protrusion extending in the coupling direction (the X-axis direction) in another embodiment.

The insert guide 620 comprises at least one guide surface 621 which is in contact with the sliding surface 221 of the insert 200. The at least one guide surface 621 defines a surface extending in the forward and backward direction. The at least one guide surface 621 may comprise a pair of guide surfaces 621 corresponding to the pair of sliding surfaces 221 of the insert 200.

The guide surface 621 comprises a first guide surface 621a in contact with the first sliding surface 221a, a second guide surface 621b in contact with the second sliding surface 221b, and a third guide surface 621c in contact with the third sliding surface 221c. The second guide surface 621b and the third guide surface 621c face each other while being spaced apart vertically from each other, and the groove 621h is formed between the second guide surface 621b and the third guide surface 621c.

The insert guide 620 comprises at least one stopper 622 in contact with the stopper counterpart portion 222 of the insert 200. The at least one stopper 622 may comprise a rear surface. The at least one stopper 622 may comprise a pair of stoppers 622 corresponding to the pair of stopper counterpart portions 222 of the insert 200.

The stopper 622 may comprise a plurality of rear surfaces spaced apart from each other in the forward-backward direction. The stopper 622 may comprise a first stopper surface 622a in contact with the first stopper counterpart surface 222a, and second stopper counterpart surfaces 622b and 622c in contact with the second stopper counterpart surfaces 222b and 222c.

The housing 600 comprises a coupling portion 630 to be coupled to the body 400. The coupling portion 630 is formed at an end portion of the housing 600 forming the opening 600h. The end portion of the housing 600 is embedded in the body 400. The coupling portion 630 is embedded in the body 400.

The coupling portion 630 comprises at least one of a rib 631 formed to protrude in a direction perpendicular to the coupling direction (the X-axis direction) and a groove 633 formed to be recessed in the direction perpendicular to the coupling direction (the X-axis direction). In the present embodiment, the coupling portion 630 comprises both the rib 631 and the groove 633. In another embodiment, only one of the rib 631 and the groove 633 may be provided.

The coupling portion 630 extends to surround the opening 600h. The coupling portion 630 may extend in a ring shape.

The rib 631 extends around the opening 600h. The rib 631 may surround the opening 600h. The rib 631 may protrude in an outward direction from an outer surface of the coupling portion 630. The term "outward direction" used herein means a direction away from a virtual axis passing through the center of the opening 600h in the forward-backward direction. The rib 631 may have a thickness in the forward-backward direction and may be formed in a rib shape extending along a circumferential direction around the opening 600h. A fastening force between the housing 600 and the body 400 can be increased through the rib 631. Further, moisture may be prevented from entering between the housing 600 and the body 400 by the rib 631. The rib 631 is formed at a thickness of a predetermined value or less in the forward-backward direction. Accordingly, during the injection-molding of the body 400, a portion of the rib 631 may melt due to the high-temperature injection-molding material, which makes it possible to increase the fastening force of the body 400 and the rib 631.

The groove 633 extends around the opening 600h. The groove 633 may surround the opening 600h. The groove 633 may be recessed in an inward direction from the outer surface of the coupling portion 630. The term "inward direction" used herein refers to a direction close to the virtual axis passing through the center of the opening 600h in the forward-backward direction.

The coupling portion 630 comprises an edge portion 635 that forms an edge of a rear end portion of the housing 600. The groove 633 may be formed between the rib 631 and the edge portion 635 which are spaced apart from each other in the forward-backward direction. The edge portion 635 is positioned at the backward side of the rib 631. The edge portion 635 extends around the opening 600h. The edge portion 635 may surround the opening 600h.

The coupling portion 630 comprises an end surface 636 that forms the rear end of the housing 600. The end surface 636 may form a rear end surface connected to the edge portion 635. The end surface 636 extends around the opening 600h. The end surface 636 may surround the opening 600h.

The housing 600 comprises at least one sensing-part guide 650 configured to form a groove 650h for guiding the position of the sensing part 100. The sensing-part guide 650 forms the groove 650h extending parallel to the coupling direction (the X-axis direction). While in the present embodiment, the sensing-part guide 650 forms the groove extending in the coupling direction, the sensing-part guide 650 may form a protrusion extending in the coupling direction in another embodiment.

The sensing-part guide 650 comprises at least one guide surface 651 which is slidably brought into contact with a side surface of the sensing part 100 when the sensing part 100 is inserted into the housing 600. The guide surface 651 extends in the coupling direction (the X-axis direction). In the present embodiment, the guide surface 651 is brought into contact with the edge of the PCB 110 of the sensing part 100.

The sensing-part guide 650 comprises a stopper 652 forming a rear surface. The stopper 652 is brought into contact with the front surface of the sensing part 100 to limit the sensing part 100 from moving in the forward direction from a predetermined position. In the present embodiment, the stopper 652 is brought into contact with the front surface of the edge portion of the PCB 110 of the sensing part 100.

As can be seen from FIGS. 3, 4, and 9, the gap between the rear surfaces A1 and A2 out of the inner surface of the housing 600 and the front surface of the sensing part 100 is filled with the filling material 700. The sensing part 100 faces the rear surfaces A1 and A2 of the housing 600. The front surface of the PCB 110 faces the rear surfaces A1 and A2 of the housing 600. The front surface of the sensor 120 faces the rear surfaces A1 and A2 of the housing 600.

The rear surfaces A1 and A2 out of the inner surface of the housing 600, which face the sensing part 100, comprise a sensor counterpart surface A1 formed to be recessed in the forward direction. The sensor counterpart surface A1 faces the front surface of the sensor 120. The front surface of the sensor 120 protrudes in the forward direction relative to other portions of the sensing part 100. In this case, the filling material 700 can be induced to smoothly cover the front surface of the sensor 120 through the recessed sensor counterpart surface A1.

The sensor counterpart surface A1 is recessed at a predetermined depth t1 in the forward direction compared to the remaining surface A2 out of the rear surfaces A1 and A2. The depth t1 may be in a range of 1.8 to 2.2 mm. For example, the depth t1 may be 2 mm. Accordingly, the front surface of the sensing part 100 and the rear surfaces A1 and A2 of the housing 600 may be spaced apart from each other at a proper distance. Specifically, by forming the front surface of the sensing part 100 to be not in contact with the rear surfaces A1 and A2 of the housing 600, it is possible to prevent the sensing part 100 from being damaged due to the contact between the housing 600 and the insert 200 during assembly. Further, it is possible to prevent the sensing part 100 from being damaged due to the high-temperature injection-molding material during the injection-molding of the body 400. In addition, it is possible to prevent the front surface of the sensor 120 from being excessively separated from the sensor counterpart surface A1 of the housing 600, thus preventing a degradation in the sensing function of the sensor 120 configured to sense the sensing object.

Figure 10:
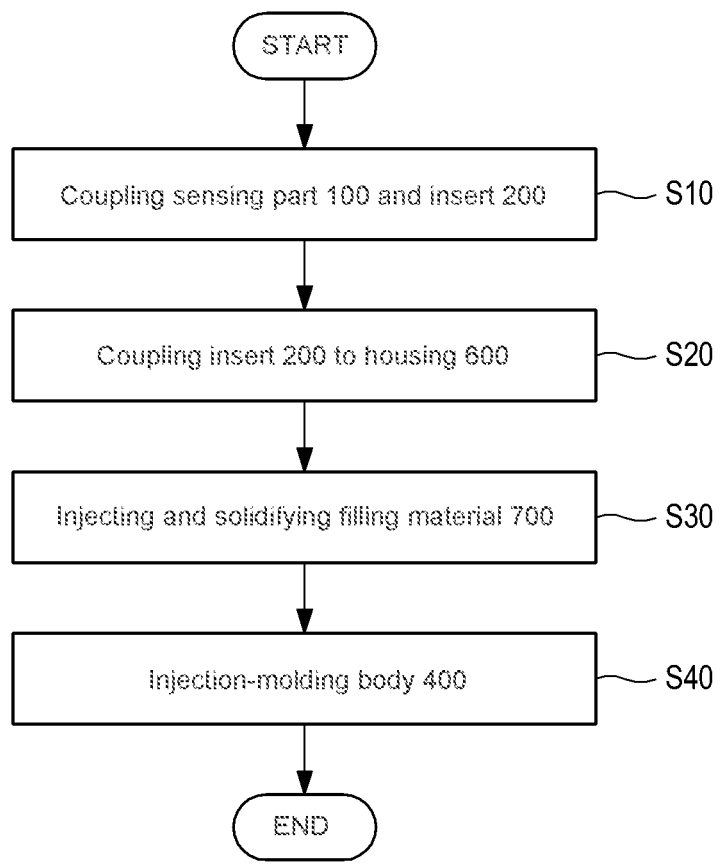
FIG. 10 is a flowchart for explaining a method of manufacturing the sensing device for vehicle according to one embodiment of the present disclosure.

FIG. 10 is a flowchart for explaining a method of manufacturing the sensing device for vehicle according to one embodiment of the present disclosure. Although processes, steps, algorithms, or the like have been described in sequential order in the flowchart shown in FIG. 10, such processes, steps, and algorithms may be performed in any suitable sequence. In other words, the processes, steps, and algorithms described in various embodiments of the present disclosure need not be performed in the order described in the present disclosure. Also, although some of the steps are described as being performed in an asynchronous manner, some of these steps may be performed in a simultaneous manner in another embodiment. Further, exemplary processes illustrated in the drawing do not mean that they are not changed and modified in other forms. Further, some of the illustrated process or steps thereof may be omitted in one or more of various embodiments of the present disclosure. Further, it should be noted that the illustrated process is not necessarily essential.

As shown in FIG. 10, the method of manufacturing the sensing device for vehicle according to one embodiment of the present disclosure comprises step S10 of coupling the sensing part 100 and the insert 200. In step S10, the sensing part 100 is inserted between the pair of mounting portions 210 of the insert 200 from the backward side from the forward side. In step S10, the sensing part 100 is slidably inserted in the backward direction along the clamping surface 211 of the insert 200, and is caught (locked) by the locking surface 213 of the insert 200.

The method of manufacturing the sensing device for vehicle according to one embodiment of the present disclosure comprises step S20 of inserting the insert 200 into the opening 600h of the housing 600, after step S10. In step S20, by inserting the insert 200 into the opening 600h of the housing 600, the insert 200 passes through the opening 600h so that the sensing part 100 is disposed within the housing 600. The insert 200 is inserted into the opening 600h of the housing 600 from the backward side from the forward side. In step S20, the sensing part 100 is slidably inserted in the forward direction along the guide surface 651 of the housing 600, and caught by the stopper 652 of the housing 600. In step S20, the slider 220 of the insert 200 is slidably inserted along the guide surface 621 of the housing 600, and the stopper counterpart portion 222 of the insert 200 is caught by the stopper 622 of the housing 600.

The method of manufacturing the sensing device for vehicle according to one embodiment of the present disclosure comprises step S30 of injecting the filling material 700 of a liquid state into the housing 600 and solidifying the filling material 700, after step S20. In step S30, an empty portion of the inner space 600s of the housing 600 is filled with the liquid filling material 700. After the interior of the housing 600 is filled with the liquid filling material 700, the filling material 700 is solidified at a temperature of a predetermined range.

The method of manufacturing the sensing device for vehicle according to one embodiment of the present disclosure comprises step S40 of injection-molding the body 400 such that a portion of the insert 200 and a portion of the housing 600 are embedded in the body 400, after step S30. In step S40, the body 400 may be injection-molded by injecting the injection-molding material into an injection mold in a state in which the housing 600 is coupled to the injection mold.

In step S40, the body 400 is injection-molded so as to cover the opening 600h of the housing 600. A portion exposed out of the opening 600h of the housing 600 in the insert 200 is embedded in the body 400. Also, the coupling portion 630 formed at the rear end portion of the housing 600 is embedded in the body 400.

The filling material 700 and the body 400 may be formed of different materials. The highest temperature according to the solidification of the filling material 700 in step 30 is lower than the highest temperature according to the injection molding of the body 400 in step S40. This makes it possible to prevent defect or damage from occurring in the sensing part 100 due to the high temperature.

In the embodiment in which the terminals 313 are provided, the insert 200 and the terminals 313 may be coupled to each other, before step S10. Before injection-molding the terminal fixing portion 250 of the insert 200, the terminals 313 are disposed on the upper surface of the insert 200. In the state in which the terminals 313 are disposed, the terminal fixing portion 250 is injection-molded so that a portion of terminal 313 is embedded in the terminal fixing portion 250, and the terminals 313 are coupled to the insert 200. Then, in step S10, the sensing part 100 is inserted into the insert 200, and the terminal coupling portion 313a of the terminal 313 is connected to the terminal part 130 of the sensing part 100.

In the embodiment in which the terminals 313 are provided, the terminals 313 and the connection lines 311 are connected to each other, before step S40. The connection line 311 may be connected to the terminal 313 after the insert 200 and the terminal 313 are coupled to each other.

In one embodiment, the terminal 313 and the connection line 311 may be connected to each other by inserting a welding tool through the hole 200h of the insert 200 and performing welding with the welding tool. In this embodiment, the terminal 313 and the connection line 311 are welded while being in vertical contact with each other. In the case of resistance welding, two welding tools need to be brought into contact with the terminal 313 and the connection line 311 in a simultaneous manner, and also need to be vertically arranged while clamping the terminal 313 and the connection line 311. In the embodiment described with reference to the drawings, one welding tool may be inserted through the hole 200h of the insert 200 from below upward, and may be contacted to one end of the terminal 313.

Although the technical spirit of the present disclosure has been described using some embodiments and examples shown in the accompanying drawings, it should be noted that various substitutions, modification, and variations can be devised by those skilled in the art to which the present disclosure pertains without departing from the technical spirit and scope of the present disclosure. Further, it should be construed that these substitutions, modifications, and variations are included within the scope of the appended claims.

What is claimed is:

1. A wheel bearing assembly, comprising:
   an outer ring part configured to be fixed to a vehicle body;
   an inner ring part configured to be rotatable relative to the outer ring part while rotating together with a wheel;
   a bearing disposed between the outer ring part and the inner ring part; and
   at least one sensing device configured to sense wheel-related information, wherein the sensing device comprises:
   a body formed of a first material and is disposed fixedly relative to the outer ring part;
   a housing having an opening formed at one side thereof and coupled to the body;
   a sensing part disposed inside the housing and configured to sense the wheel-related information to generate a signal;
   an insert to which the sensing part is fixed and disposed to pass through the opening such that a portion of the insert is embedded in the body;

at least one connection part connected to the sensing part so as to supply power to the sensing part or to transmit the signal from the sensing part; and a filling material provided to fill an inner space of the housing and formed of a second material different from the first material.

2. The wheel bearing assembly of claim 1, wherein a gap between an inner surface of the housing and the sensing part is filled with the filling material.

3. The wheel bearing assembly of claim 1, wherein the filling material covers at least a portion of the sensing part such that the sensing part is spaced apart from the body.

4. The wheel bearing assembly of claim 1, wherein the sensing part comprises a sensor located at a front portion of the sensing part and configured to sense the wheel-related information, and wherein a gap between an inner surface of the housing and a front surface of the sensor is filled with the filling material.

5. The wheel bearing assembly of claim 4, wherein a rear surface, which faces the sensing part, in the inner surface of the housing comprises a sensor counterpart surface that is recessed in a forward direction and faces the front surface of the sensor.

6. The wheel bearing assembly of claim 5, wherein the sensor counterpart surface is recessed in a range of 1.8 to 2.2 mm in the forward direction compared to a remaining surface of the rear surface.

7. The wheel bearing assembly of claim 4, wherein the insert comprises a stopper counterpart surface in contact with a rear surface in the inner surface of the housing, and the stopper counterpart surface is located in front of the front surface of the sensing part.

8. The wheel bearing assembly of claim 7, wherein the sensing part comprises a printed circuit board (PCB) provided to face in a forward direction, the sensor is disposed on a front surface of the PCB, the front surface of the sensor is located at a distance of 0.15 to 0.25 mm in the forward direction from the front surface of the PCB, and the stopper counterpart surface is located at a distance of 0.8 to 1.2 mm in the forward direction from the front surface of the PCB.

9. The wheel bearing assembly of claim 1, wherein the first material comprises a synthetic resin, and the second material comprises at least one of epoxy, urethane, and hot melt adhesive.

10. The wheel bearing assembly of claim 1, wherein the body covers the opening of the housing.

11. The wheel bearing assembly of claim 10, wherein an end portion of the housing, which forms the opening, is embedded in the body, and the end portion of the housing comprises a coupling portion having at least one of a rib formed to protrude in a direction perpendicular to a coupling direction in which the housing is coupled to the body, and a groove formed to be recessed in the direction perpendicular to the coupling direction.

12. The wheel bearing assembly of claim 1, wherein the housing comprises an insert guide configured to form a groove or protrusion extending parallel to a coupling direction in which the insert is coupled to the housing, and the insert comprises a slider configured to be engaged with the insert guide.

13. The wheel bearing assembly of claim 1, wherein the insert comprises a mounting portion having a surface on which the sensing part is mounted, and the housing comprises a sensing-part guide configured to form a groove for guiding a position of the sensing part.

14. The wheel bearing assembly of claim 1, wherein the body is formed by injection-molding such that a portion of the insert and at least a portion of the housing are embedded in the body in a state in which the insert and the housing are disposed in the body.

15. The wheel bearing assembly of claim 14, wherein the filling material is injected into the housing in a liquid state and is solidified inside the housing.

16. The wheel bearing assembly of claim 1, wherein the sensing part comprises a sensor configured to sense the wheel-related information and a protection circuit configured to protect the sensor.

* * * * *